June 13, 1967  R. J. HERBOLD  3,325,172

DRY SEAL FOR ROTARY SHAFT

Filed Sept. 28, 1964

INVENTOR.
ROBERT J. HERBOLD
BY
Fryer + Gjenswold
ATTORNEYS

United States Patent Office 3,325,172
Patented June 13, 1967

3,325,172
DRY SEAL FOR ROTARY SHAFT
Robert J. Herbold, Santa Clara, Calif., assignor, by mesne assignments, to Technical Operations, Incorporated, Burlington, Mass., a corporation of Delaware
Filed Sept. 28, 1964, Ser. No. 399,486
5 Claims. (Cl. 277—26)

This invention relates to seals and particularly to a seal for use with a very high speed rotating shaft in applications where liquid lubricant is undesirable and where sealing is required between two areas characterized by a differential in pressure of air or other gaseous media.

One example of an environment in which the present invention has proven highly successful is between the shaft and housing of the turbine which drives a rotating mirror in a high speed camera. Because of the fact that such mirrors operate at very high speeds, that is in the order of 10,000 r.p.s. to 18,000 r.p.s., they tend to compress or vary the density of air in the camera housing. This causes a variation in the coefficient of refraction of the air in the optical system and a consequent deterioration of resolution of the image. It has been found that a partial vacuum in the order of four mms. of mercury or greater maintained in the camera housing eliminates this undesirable phenomenon. The lower pressure also greatly reduces the power required to drive the rotating mirror. For example eight horse power is required to drive a mirror at 10,000 r.p.s. in air and only one-half horse power is required in a partial vacuum of 4 mms. of mercury. However further difficulties have been encountered in sealing the space between the shaft and the housing. A close fit between the shaft and the opening through which it passes is not feasible because the shaft tends to whip or vibrate as it passes through certain ranges of speed in attaining its full operating speed. The seal must be sufficiently flexible to accommodate this eccentric movement of the shaft and a liquid lubricant has proven unfeasible. For example when oil is used the lower pressure causes it to enter the housing and fog the surfaces of the optical components which reduces their efficiency of light transmission.

An ordinary dry seal with frictional contact between a seal element and the shaft is inoperable in such an environment because the relative speed of surfaces in contact is so great that the seal and shaft are both destroyed in a few seconds of operation.

It is the object of the present invention to provide a dry seal for extremely high speed shaft operation such as that described above capable of overcoming all of the disadvantages mentioned and to provide a seal having very close proximity but not actual contact with the shaft as it operates at full speed.

A further object is to provide a seal with an annular part surrounding and in contact with the shaft while it is static but supported and arranged to expand away from the shaft from the heat of friction as the shaft builds up speed and before destructive heat is experienced.

Further and more specific objects and advantages of the invention and the manner in which it is carried into practice are made apparent in the following specification wherein reference is made to the accompanying drawing.

Figure 1:
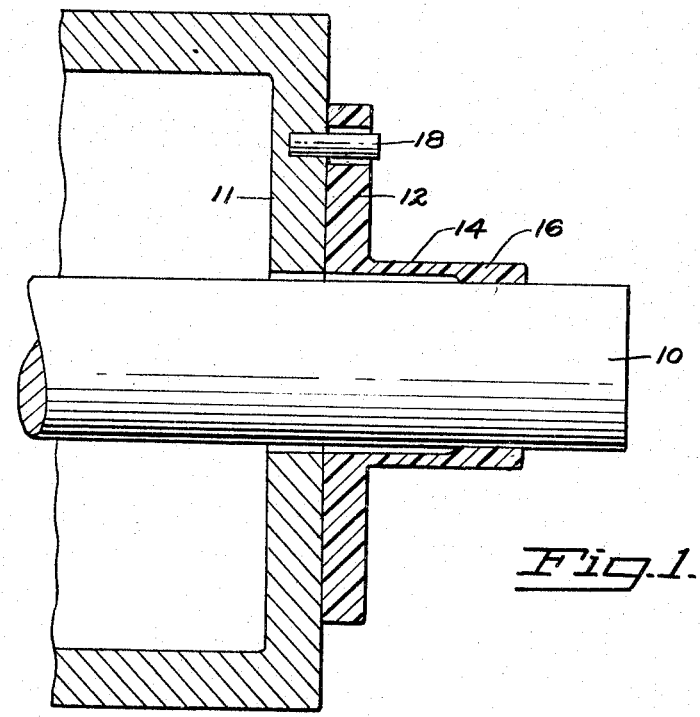
FIG. 1 is a view in cross section of a seal embodying the present invention shown operatively associated between a shaft and a housing.

A shaft 10 is illustrated as passing through a suitable opening in a housing wall 11. The opening is sufficiently larger than the diameter of the shaft to permit some vibratory movement of the shaft which occurs as it is being brought up to top speed. The interior of the housing contains a mirror (not shown) fixed to and rotatable with the shaft and other camera components and since a reduced pressure is maintained within the housing the seal of the present invention is employed to prevent the entry of any large quantity of air at atmospheric pressure through the opening which surrounds the shaft. The seal comprises a flat base member 12 of annular configuration and a tubular extension 14 which surrounds the shaft and is spaced therefrom except for an area adjacent its outer ends where it has a free sliding fit which establishes light frictional contact with the shaft. Thus the outer thicker portion of the extension which is shown at 16 is supported by the thinner and flexible tubular part which extends between itself and the base 12.

The entire seal is formed of a plastic and metal composition which is tough and will expand when subjected to heat. Consequently when the shaft starts to rotate, frictional contact with the thick porion 16 causes expansion of such portion to a point where it is spaced from the shaft providing clearance which is occupied by a very thin film of air. Consequently little or no further heat is transferred to the seal and it is in sufficiently close contact with the shaft to exclude any appreciable flow of air into the housing. Furthermore since the low pressure in the housing is continuously maintained even a slight leakage of air over a long period of time would not change the existing low pressure. The seal need not be secured against the housing since it will be held in place during operation by the higher pressure on its exterior surface. It is held against rotation with respect to the housing by a small pin such as illustrated at 18.

As an example, a seal for a shaft which is one-eighth inch in diameter will have a total diameter at its base 12 of less than one-half inch and has proven to operate successfully at speeds in excess of 10,000 r.p.s. It may be made of Teflon filled with bronze of 60% by weight. Several such compounds are commercially available, one being known as R. S. Hughes Co. S75. The expansion of that portion of the seal which contacts the shaft when it is at rest is believed to be in the order of .001 to .0015 inch and it is known that sufficient heat is absorbed by the seal to cause its expansion prior to a destructive effect on the shaft since no discoloration of the shaft takes place which indicates that its temperature remains under 350° F.

Figure 2:
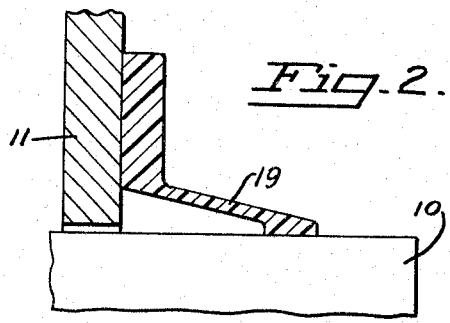
FIGS. 2, 3 and 4 are fragmentary sectional views illustrating modified forms of the seal shown in FIG. 1.
Figure 4:
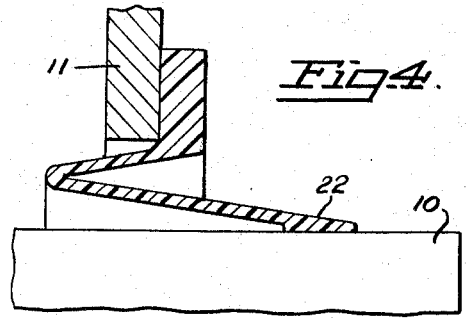
Figure 3:
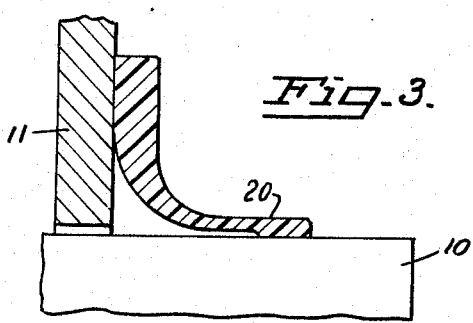

The invention is not limited to specific construction and proportions illustrated in FIG. 1 but may assume other forms such as those suggested in FIGS. 2, 3 and 4 wherein seal elements shown respectively at 19, 20 and 22 are illustrated in association with a shaft 10 and housing 11 such as those shown in FIG. 1.

I claim:

1. A vacuum seal for a high speed rotary shaft which extends through a housing in which pressure is less than atmospheric having a part surrounding and contacting the shaft while it is static, and means supporting said part to enable it to expand away from the shaft from the heat of friction upon rotation of the shaft and before the heat becomes destructive to the shaft or seal thereby creating a space between the seal and the shaft, the spacing from the shaft during operation being sufficient to permit flow of a thin film of gas at atmospheric pressure into the housing between the shaft and seal, and said seal being formed entirely of a single piece of material.

2. The seal of claim 1 having a base adapted to bear against the housing and surrounding the shaft, and a flexible annular portion connecting the base and part surrounding the shaft.

3. The seal of claim 2 in which the base and the flexible portion are spaced from the shaft to accommodate vibration which occurs during acceleration of the shaft and which space forms a continuation of that space which is caused by the heat of friction.

4. The combination of claim 2 in which the base is held against rotation with respect to the housing.

5. The combination of claim 3 in which the seal is formed of a plastic-metal composition.

References Cited

UNITED STATES PATENTS 2,253,904  8/1941  Haug ---------------- 277—26
3,056,709  10/1962  Rising et al.

LAVERNE D. GEIGER, *Primary Examiner.*

D. MASSENBERG, *Assistant Examiner.*